(12) United States Patent
Takahashi

(10) Patent No.: US 11,812,204 B2
(45) Date of Patent: Nov. 7, 2023

(54) INFORMATION PROCESSING DEVICE, INFORMATION PROCESSING METHOD, AND PROGRAM

(71) Applicant: SONY CORPORATION, Tokyo (JP)

(72) Inventor: Noriaki Takahashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 319 days.

(21) Appl. No.: 16/981,877

(22) PCT Filed: Jan. 16, 2019

(86) PCT No.: PCT/JP2019/001066
§ 371 (c)(1),
(2) Date: Sep. 17, 2020

(87) PCT Pub. No.: WO2019/187510
PCT Pub. Date: Oct. 3, 2019

(65) Prior Publication Data
US 2021/0099682 A1    Apr. 1, 2021

(30) Foreign Application Priority Data
Mar. 29, 2018   (JP) ................. 2018-064441

(51) Int. Cl.
*G03B 21/14*   (2006.01)
*H04N 9/31*    (2006.01)
(Continued)

(52) U.S. Cl.
CPC ......... *H04N 9/3185* (2013.01); *G06T 3/4007* (2013.01); *G06T 5/002* (2013.01); *H04N 9/3182* (2013.01); *H04N 9/3191* (2013.01)

(58) Field of Classification Search
CPC .. H04N 9/3179; H04N 9/3182; H04N 9/3188; G03B 21/14; G06T 3/4007; G06T 3/4015
See application file for complete search history.

(56) References Cited

U.S. PATENT DOCUMENTS

2011/0310014 A1\*  12/2011  Mizuno .............. H04N 9/04557
                                                                        348/E9.002
2013/0162866 A1\*  6/2013  Kimura ................. H04N 5/367
                                                                        348/231.99
2016/0134851 A1     5/2016  Grundhofer

FOREIGN PATENT DOCUMENTS

CN        103686029 A      3/2014
CN        107431779 A     12/2017
(Continued)

OTHER PUBLICATIONS

Oh et al., Edge Adaptive Color Demosaicking Based on the Spatial Correlation of the Bayer Color Difference, EURASIP Journal on Image and Video Processing, 2010, pp. 1-14, vol. 2010.
(Continued)

*Primary Examiner* — Ryan D Howard
(74) *Attorney, Agent, or Firm* — Paratus Law Group, PLLC

(57) ABSTRACT

An artifact upon imaging degrades sensing accuracy of a projection image. An information processing device that develops a captured image thus performs interpolation processing using interpolation direction information according to a test pattern projected by a projection device. In other words, the interpolation processing of pixel information in an interpolation direction according to the obtained interpolation direction information is performed with respect to an image signal obtained by capturing the projection image of the test pattern. This can suppress the artifact and improve the sensing accuracy.

11 Claims, 11 Drawing Sheets

A

TEST PATTERN TPh12 HAVING VERTICAL CORRELATION

B

VERTICAL INTERPOLATION

C

TEST PATTERN TPv12 HAVING HORIZONTAL CORRELATION

D

HORIZONTAL INTERPOLATION

(51) Int. Cl.
    *G06T 3/40*     (2006.01)
    *G06T 5/00*     (2006.01)

(56) References Cited

FOREIGN PATENT DOCUMENTS

| JP | H06-006816 A | 1/1994 |
|---|---|---|
| JP | 2013-128217 A | 6/2013 |
| JP | 2017-215374 A | 12/2017 |

OTHER PUBLICATIONS

Apr. 25, 2023, Chinese Office Action issued for related CN Application No. 201980021201.0.

* cited by examiner

FIG.1
A
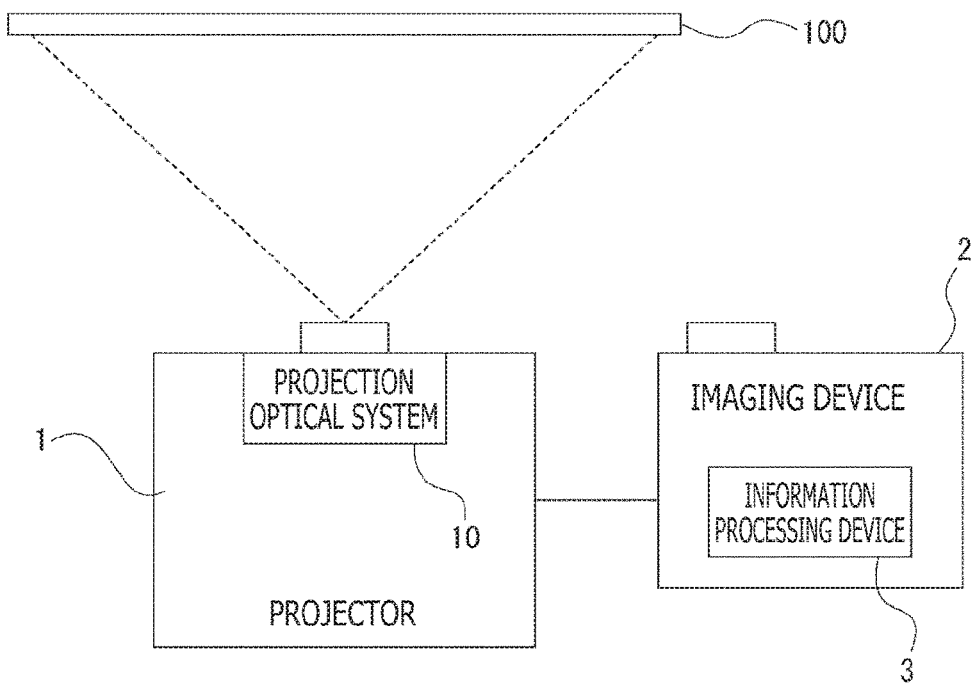
B
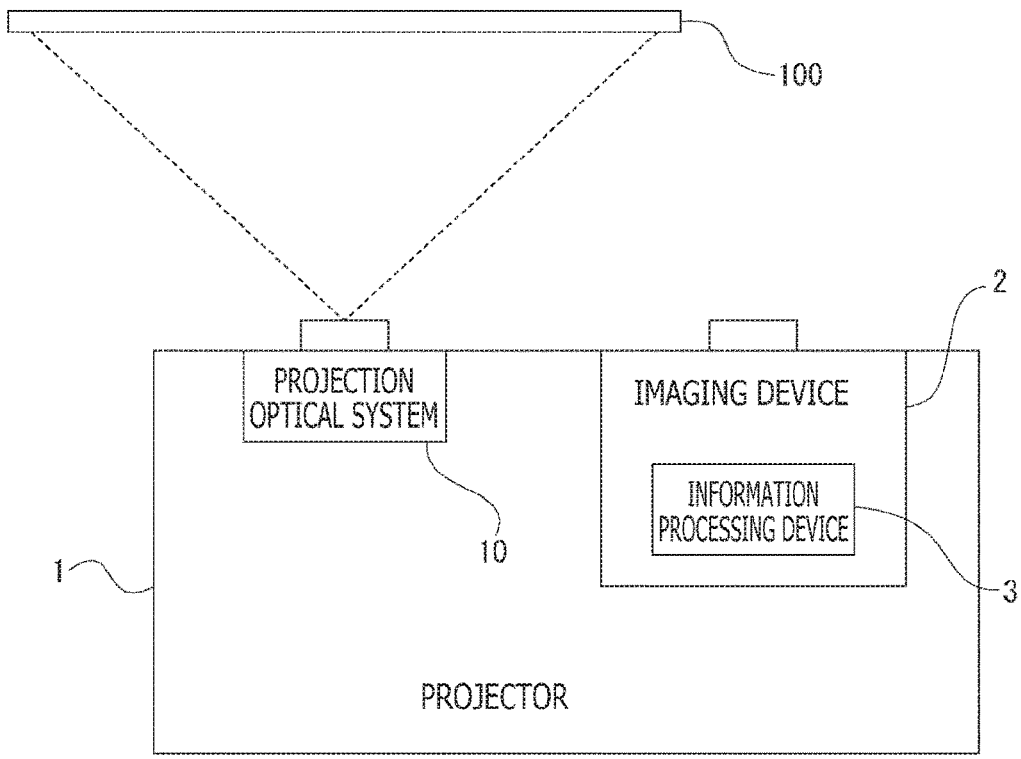

FIG. 2
A
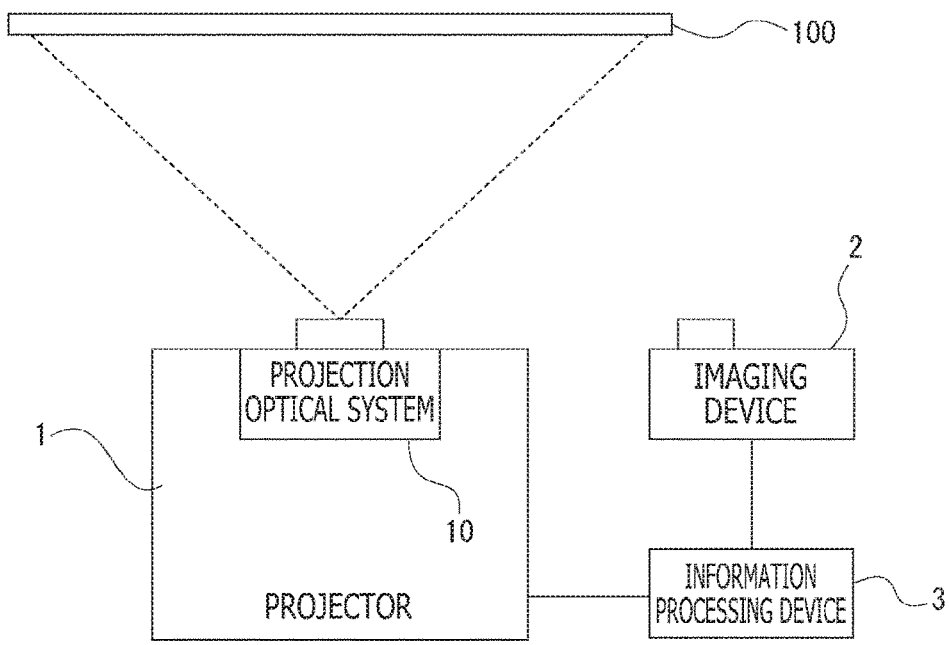
B
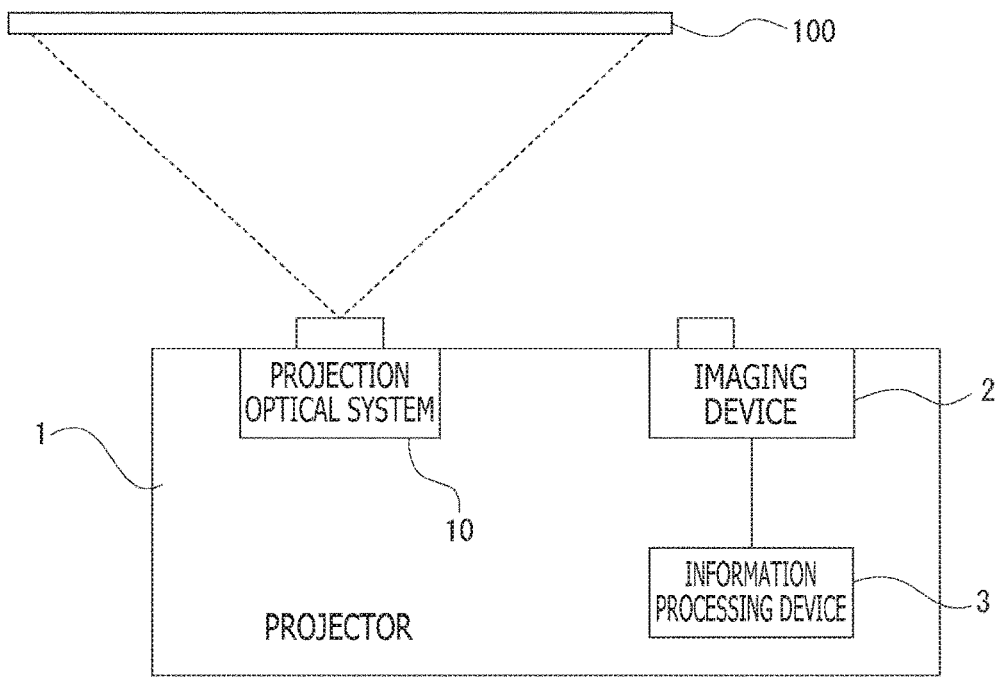

F I G . 5

A    B    C

HIGH-FREQUENCY PATTERN    OCCURRENCE OF MOIRE OR FALSE COLOR

FIG.8
A
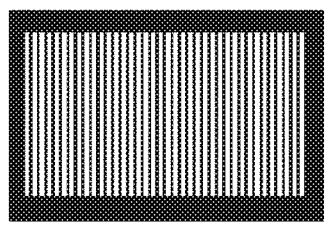
TEST PATTERN TPh12 HAVING
VERTICAL CORRELATION
B
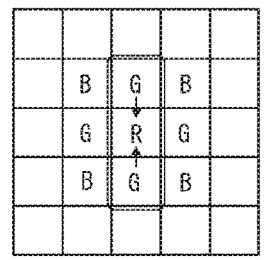
VERTICAL INTERPOLATION
C
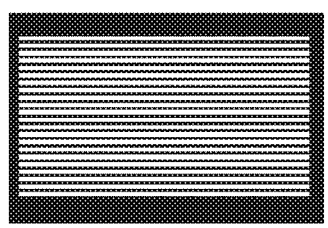
TEST PATTERN TPv12 HAVING
HORIZONTAL CORRELATION
D
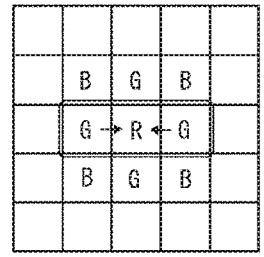
HORIZONTAL INTERPOLATION

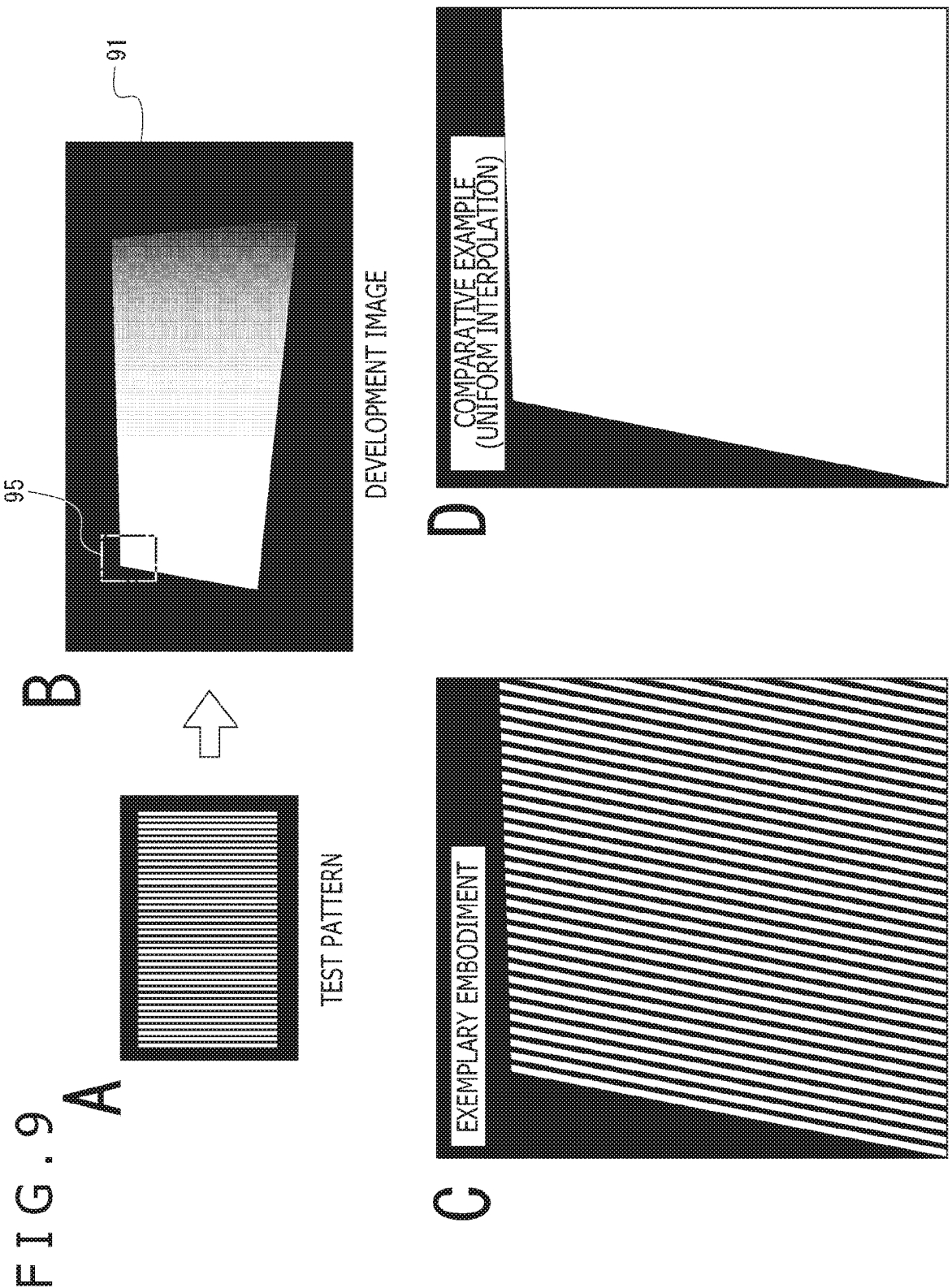

FIG. 10

| | | COMPARATIVE EXAMPLE (ACCURACY OF LSB IS LOW) | | | | | EXEMPLARY EMBODIMENT (ACCURACY IS HIGH UP TO LSB) | | | | |
|---|---|---|---|---|---|---|---|---|---|---|---|
| COORDINATE ON CAPTURED IMAGE | CORRECT PROJECTOR COORDINATE VALUE | SENSED BIT DATA (←MSB  LSB→) | | | | PROJECTOR COORDINATE VALUE DECODED FROM BIT DATA | ERROR IN PROJECTOR COORDINATE VALUE | SENSED BIT DATA (←MSB  LSB→) | | | PROJECTOR COORDINATE VALUE DECODED FROM BIT DATA | ERROR IN PROJECTOR COORDINATE VALUE |
| 0 | 0.26 | 0 | 0 | 0 | 0 | 0 | 0.26 | 0 | 0 | 0 | 0 | 0.26 |
| 1 | 1.00 | 0 | 0 | 0 | 1 | 1 | 0.00 | 0 | 0 | 0 | 1 | 0.00 |
| 2 | 1.74 | 0 | 0 | 1 | 1 | 3 | -1.26 | 0 | 0 | 1 | 2 | -0.26 |
| 3 | 2.48 | 0 | 0 | 1 | 1 | 3 | -0.52 | 0 | 0 | 1 | 2 | 0.48 |
| 4 | 3.22 | 0 | 1 | 1 | 0 | 4 | -0.78 | 0 | 0 | 1 | 3 | 0.22 |
| 5 | 3.96 | 0 | 1 | 0 | 1 | 5 | -1.04 | 0 | 1 | 0 | 4 | -0.04 |
| 6 | 4.70 | 0 | 1 | 0 | 0 | 4 | 0.70 | 0 | 1 | 0 | 5 | -0.30 |
| 7 | 5.44 | 0 | 1 | 1 | 1 | 7 | -1.56 | 0 | 1 | 1 | 5 | 0.44 |
| 8 | 6.19 | 0 | 1 | 1 | 1 | 7 | -0.81 | 0 | 1 | 1 | 6 | 0.19 |
| 9 | 6.93 | 0 | 1 | 1 | 0 | 6 | 0.93 | 1 | 0 | 1 | 7 | -0.07 |
| 10 | 7.67 | 1 | 0 | 0 | 1 | 9 | -1.33 | 1 | 1 | 0 | 8 | -0.33 |
| 11 | 8.41 | 1 | 0 | 0 | 0 | 8 | 0.41 | 1 | 0 | 0 | 8 | 0.41 |
| 12 | 9.15 | 1 | 0 | 1 | 1 | 11 | -1.85 | 1 | 0 | 1 | 9 | 0.15 |
| 13 | 9.89 | 1 | 0 | 1 | 0 | 10 | -0.11 | 1 | 0 | 1 | 10 | -0.11 |
| 14 | 10.63 | 1 | 0 | 1 | 1 | 11 | -0.37 | 1 | 0 | 1 | 11 | -0.37 |
| 15 | 11.37 | 1 | 1 | 0 | 0 | 12 | -0.63 | 1 | 0 | 1 | 11 | 0.37 |
| C1 | C2 | C3 | C4 | C5 | C6 | C7 | C8 | C9 | C10 | C11 | C12 | C13 | C14 |

SQUARE SUM OF ERRORS  13.96

SQUARE SUM OF ERRORS  1.33

FIG.11
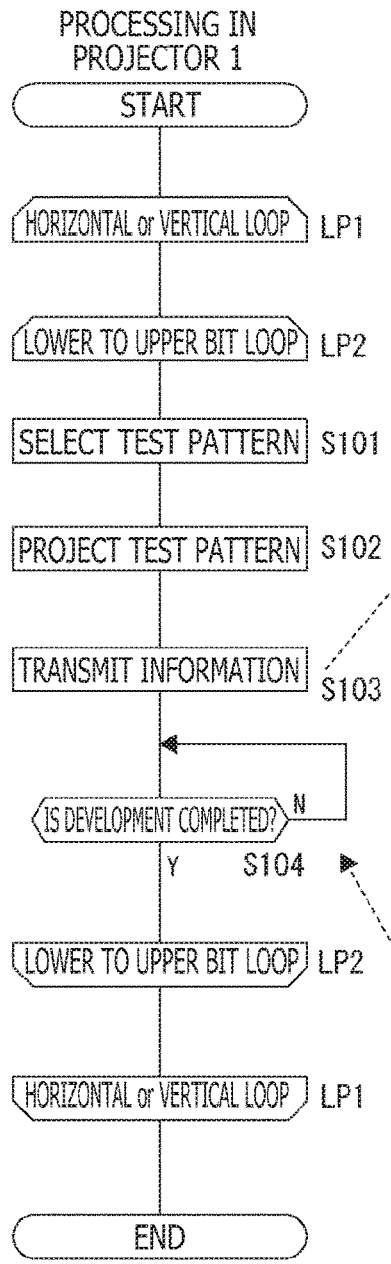
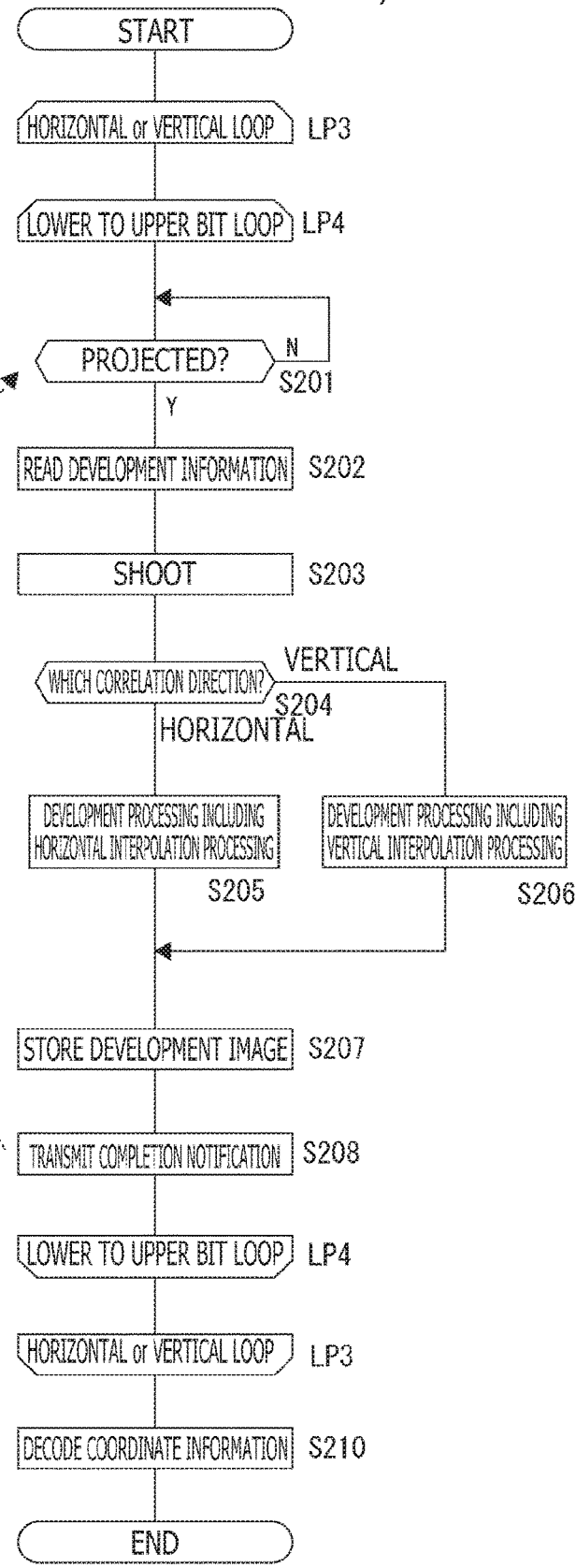

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2019/001066 (filed on Jan. 16, 2019) under 35 U.S.C. § 371, which claims priority to Japanese Patent Application No. 2018-064441 (filed on Mar. 29, 2018), which are all hereby incorporated by reference in their entirety.

TECHNICAL FIELD

The present technology relates to an information processing device, an information processing method, and a program and particularly to a technical field regarding imaging and development of a projection image, which are performed for calibration of a projection device.

BACKGROUND ART

There is a case where an image on a screen, which is projected by a projection device such as a liquid crystal projector, is captured by an imaging device (camera), and calibration of the projection device is performed based on the captured image.

PTL 1 indicated below describes capturing a projection image by a camera to detect a color shift amount of the projection image.

CITATION LIST

Patent Literature

[PTL 1]
Japanese Patent Laid-open No. Hei 6-6816

SUMMARY

Technical Problems

Meanwhile, there is a case where obtaining, on a captured image, identification information regarding each pixel (e.g., pixel numbers in horizontal and vertical directions) in a projection image is demanded, to achieve calibration, for example, geometric correction, of a projection device. In other words, determining a position (corresponding point), on captured image data, for each pixel in the projection image on a screen is demanded.

To achieve this, the pixel position in the projection image is detected from the captured image obtained by projecting a predetermined test pattern and imaging and developing this test pattern.

However, an artifact (a data error or signal distortion occurring during an image processing step) is produced due to interpolation processing performed in development processing upon imaging, in some cases.

Generally, in the interpolation processing, an interpolation direction is detected from a captured image, and the interpolation direction is adaptively selected to perform the interpolation processing. Performing interpolation enables maintenance or improvement of resolution, whereby the interpolation processing is suitable for high definition image capturing. However, when the detection of the interpolation direction is erroneously performed, the artifact unfortunately occurs. For example, failure is likely to occur in detection of a direction of a high-frequency pattern image.

This artifact degrades accuracy of the captured image, that is, detection accuracy for a pixel position in the projection image. This may hinder accurate calibration.

Therefore, an object of the present technology is to enable appropriate interpolation processing upon capturing of a projection image, thereby improving detection accuracy for a pixel position in the projection image.

Solution to Problems

An information processing device according to the present technology includes an interpolation processor that performs interpolation processing of pixel information in an interpolation direction based on interpolation direction information according to a test pattern projected by a projection device, with respect to an image signal obtained by capturing a projection image of the test pattern.

The present technology described above assumes a case where the test pattern is projected for calibration of the projection device such as a liquid crystal projector and an imaging device captures the projected test pattern to detect, on the captured image, a corresponding point of a pixel in the projection image. The captured image signal is subjected to the interpolation processing in development processing. At this time, the interpolation processing is performed in the interpolation direction according to each test pattern.

In the information processing device according to the present technology described above, in a case where the test patterns are prepared in plural number, each of the plural test patterns is used as a pattern image capable of decoding identification information of each pixel in the projection image from images in which the plural test patterns are captured, and the projection device sequentially projects the plural test patterns, when the projection device projects each of the plural test patterns, the interpolation processor performs the interpolation processing of the pixel information in the interpolation direction based on the interpolation direction information according to each of the plural test patterns to be projected.

Captured images of the plural test patterns as a set are pattern images that can represent identification information (e.g., pixel numbers in the horizontal and vertical directions) of each pixel in the projection image. In this case, the projection device sequentially projects each of the plural test patterns, and each of the plural test patterns thus projected is captured (sensed). The information processing device performs the interpolation processing based on the interpolation direction information according to each of the plural test patterns, upon capturing of each of the plural test patterns.

The information processing device according to the present technology described above may include a captured image decoder that decodes the identification information of each pixel in the projection image by using image signals with respect to which the interpolation processor has performed the interpolation processing and that respectively correspond to the plural test patterns.

In a case where the captured images of the plural test patterns as a set are the pattern images that can represent each pixel position in the projection image, the plural captured images (developed image signals) are used to obtain the identification information of each pixel.

In the information processing device according to the present technology described above, the interpolation direction information may be information indicating whether a direction of pixel correlation is a horizontal direction or a vertical direction.

The test pattern is assumed to be a pattern image having horizontal stripes or a pattern image having vertical stripes, for example. In this case, a direction of correlation of pixel signal values (correlation direction) is the horizontal direction in a case of the pattern image having the horizontal stripes and is the vertical direction in a case of the pattern image having the vertical stripes. The interpolation direction information is information indicating such a correlation direction.

In the information processing device according to the present technology described above, the interpolation processor may perform vertical interpolation processing using pixels aligned in the vertical direction in a case where the interpolation direction information indicates the vertical direction and performs horizontal interpolation processing using pixels aligned in the horizontal direction in a case where the interpolation direction information indicates the horizontal direction.

In other words, whether the direction of the pixel correlation is the vertical direction or the horizontal direction is recognized, and the vertical interpolation processing or the horizontal interpolation processing is performed according to the recognized direction.

The information processing device according to the present technology described above may include a development unit that performs smoothing processing for noise reduction in the interpolation direction according to the interpolation direction information.

The smoothing for the noise reduction is also performed between pixels aligned in the pixel correlation direction. This can prevent crush of information from occurring.

The information processing device according to the present technology described above may include an information obtaining unit that obtains the interpolation direction information according to the test pattern projected by the projection device.

This allows the interpolation processor to obtain the interpolation information according to the test pattern.

In the information processing device according to the present technology described above, the information obtaining unit may obtain the interpolation direction information transmitted through communication with the projection device.

For example, the projection device generates the interpolation direction information according to the test pattern to be projected and transmits the generated information to the information processing device.

In the information processing device according to the present technology described above, the information obtaining unit may obtain information regarding the projection device to use the obtained information for controlling the interpolation processor or an imaging unit that performs imaging.

As the information regarding the projection device, brightness information of the projection image, focus information, and model information are obtained, for example.

An information processing method according to the present technology includes, as an information processing method performed by an information processing device that performs interpolation processing on a captured image signal, performing the interpolation processing of pixel information in an interpolation direction based on interpolation direction information according to a test pattern projected by the projection device, with respect to an image signal obtained by capturing a projection image of the test pattern.

A program according to the present technology is a program that causes an information processing device for performing development processing on a captured image signal to perform processing for implementing the above-described information processing method.

This allows the information processing device to perform the interpolation processing in an appropriate direction.

Advantageous Effects of Invention

According to the present technology, interpolation processing in an appropriate interpolation direction according to a test pattern to be projected can be performed. This prevents occurrence of an artifact, and detection accuracy for a pixel position in a projection image can be improved.

Note that effects described herein are not necessarily limited, and any effect described in the present disclosure may be provided.

BRIEF DESCRIPTION OF DRAWINGS

FIG. 1 depicts explanatory diagrams of a configuration example of a projection system according to an exemplary embodiment of the present technology.

FIG. 2 depicts explanatory diagrams of the configuration example of the projection system according to the exemplary embodiment.

FIG. 5 depicts explanatory diagrams of test pattern projection for detection of a pixel position performed in the exemplary embodiment.

FIG. 8 depicts explanatory diagrams of vertical interpolation and horizontal interpolation according to the exemplary embodiment.

FIG. 9 depicts explanatory diagrams of a development image according to the exemplary embodiment.

FIG. 10 is an explanatory diagram of an effect of the exemplary embodiment.

FIG. 11 is a flowchart of processing according to the exemplary embodiment.

DESCRIPTION OF EMBODIMENTS

Figure 3:
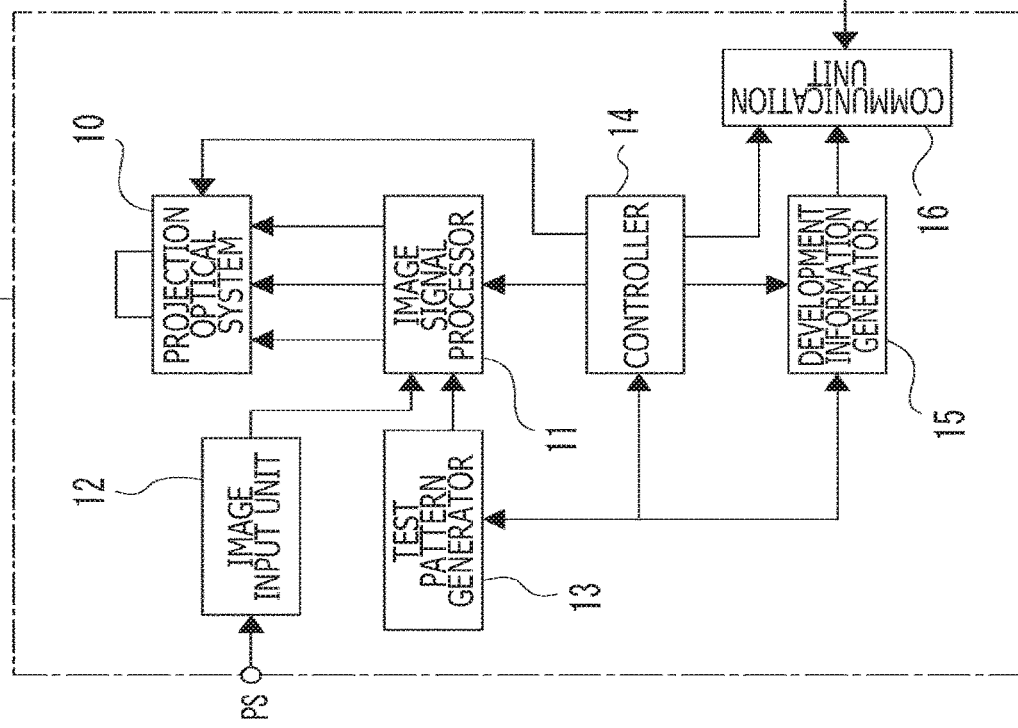
FIG. 3 is a block diagram of a projector, an imaging device, and an information processing device according to the exemplary embodiment.

Hereinafter, an exemplary embodiment will be described in the following order.

<1. Configuration Example of Projection System>
<2. Interpolation Processing Upon Detection of Pixel Position by Use of Test Patterns>
<3. Processing Procedure>
<4. Summary and Modifications>
<1. Configuration Example of Projection System>

A projection system according to the exemplary embodiment will be described.

The projection system according to the exemplary embodiment includes a projector 1, an imaging device 2, and an information processing device 3, as illustrated in FIG. 1A, for example.

The projector 1 is, for example, a liquid crystal projector as an example of a projection device. The projector 1 includes a projection optical system 10 and projects an image on a screen 100.

The imaging device 2 is an apparatus that includes an imaging element and can capture an image. The imaging device 2 is disposed in such a manner as to be able to capture the image projected on the screen 100. As the imaging device 2, a typical digital still camera may be used, or a camera dedicated to this projection system may be used.

The imaging device 2 does not necessarily have to be fixedly disposed. Particularly, the imaging device 2 may be installed when it is necessary, for example, upon capturing the test patterns to be described later.

The information processing device 3 is illustrated as a device that performs development processing on a captured image signal (RAW image signal) captured by the imaging element in the imaging device 2.

In a case of a configuration example in FIG. 1A, the information processing device 3 is a portion incorporated in the imaging device 2. For example, an image signal processing processor that receives a captured image signal obtained by the imaging element in the imaging device 2 and performs the development processing serves as the information processing device 3. Accordingly, the information processing device 3 is implemented as a portion including, for example, a microcomputer, a CPU (Central Processing Unit), or a DSP (Digital Signal Processor) that functions as the image processing processor.

As described below, the information processing device 3 is a device including at least an information obtaining unit (a development information obtaining unit 25 in FIG. 3) that obtains information from the projector 1 and a development processor (a development unit 23 in FIG. 3) that performs development processing including interpolation processing.

In a case of a configuration in FIG. 1A, the projector 1 and the imaging device 2 (information processing device 3) are connected to each other in a communicable manner and are enabled to transmit and receive information.

The information processing device 3 performs processing for decoding position information of a pixel in a projection image from captured image data developed. Calibration of the projector 1 can be performed using this information.

The configuration example of the projector 1, the imaging device 2, and the information processing device 3 of the projection system is not limited to the example in FIG. 1A, and configuration examples in FIG. 1B, FIG. 2A, and FIG. 2B can also be assumed, for example.

A case of FIG. 1B is an example in which the information processing device 3 is incorporated in the imaging device 2 and the imaging device 2 is incorporated in the projector 1. In other words, the projector 1, the imaging device 2, and the information processing device 3 are configured as an integrated device.

FIG. 2A illustrates an example in which the projector 1, the imaging device 2, and the information processing device 3 are respectively configured as independent devices.

The imaging device 2 transmits the captured image signal (RAW image signal) obtained by the imaging element to the information processing device 3, for example.

The information processing device 3 performs the development processing on the captured image signal supplied from the imaging device 2.

The information processing device 3 can communicate with the projector 1.

FIG. 2B is an example in which the imaging device 2 and the information processing device 3 are incorporated in the projector 1 but a portion serving as the information processing device 3 is provided separately from a portion serving as the imaging device 2. For example, the imaging device 2 including a signal processing system is provided as an imaging unit in the projector 1, but the information processing device 3 having a function as that of the present exemplary embodiment is incorporated in the projector 1 as, for example, another microcomputer. The information processing device 3 may be implemented as, for example, a microcomputer in a projection operation control system in the projector 1.

As described in respective examples described above, there may be various types of configuration example of the projection system including the projector 1, the imaging device 2, and the information processing device 3.

Hereinafter, while details will be described according to the configuration example in FIG. 1A, the description can also be applied to the cases of other configurations in FIG. 1B, FIG. 2A, and FIG. 2B.

FIG. 3 illustrates the configuration example of the projector 1, the imaging device 2, and the information processing device 3.

The projector 1 includes a projection optical system 10, an image signal processor 11, an image input unit 12, a test pattern generator 13, a controller 14, a development information generator 15, and a communication unit 16.

The image input unit 12 receives an image signal PS from an external device serving as an image source. The image input unit 12 supplies the image signal PS to the image signal processors 11.

The image signal processor 11 performs, on the image signal PS thus received, various kinds of processing, such as various kinds of correction processing, gamma processing, color processing, brightness processing, contrast adjustment, sharpness adjustment, segmentation of an input image to generate a display image, and scaling, and supplies image signals of R (red), G (green), and B (blue) to the projection optical system 10.

Note that the correction processing in the image signal processor 11 includes correction filtering processing such as geometric correction, positional shift correction, and lens blur correction. As a result, the R-signal, the G-signal, and the B-signal are supplied to the projection optical system 10 as variously corrected image signals.

The projection optical system 10 includes, for example, a light source unit, a light modulation unit, and a projection lens system, and projects images based on the R-, G-, and B-image signals to cause an image to be displayed on the screen 100.

For example, as the light source unit in the projection optical system 10, various light sources such as an LED (Light Emitting Diode), a laser light source, a xenon lamp, and a mercury lamp are possible.

As the light modulation unit in the projection optical system 10, liquid-crystal light valves for R, G, and B are assumed as examples. In other words, the projection optical system 10 receives pieces of image data for R, G, and B from the image signal processor 11, generates the R-image signal, the G-image signal, and B-image signal as liquid crystal drive signals by using the pieces of image data, and respectively supplies those generated signals to the liquid-crystal light valves for R, G, and B, thereby displaying a red image, a green image, and a blue image.

In the projection optical system 10, light from the light source unit is separated in R-light, G-light, and B-light, and the R-light, G-light, and B-light respectively pass through the liquid-crystal light valves for R, G, and B, thereby forming projection light for each of the red image, the green image, and the blue image. The red image, the green image, and the blue image are combined and projected from the projection lens system, resulting in projection and display of a color image on the screen 100.

In the projection lens system, such projection is performed, and for example, focusing, an image size, and a projection angle of the projection image can also be adjusted.

Note that, while the above example is the configuration example as a transmission type liquid crystal projector, a configuration of a reflection type liquid crystal projector is also possible.

The test pattern generator 13 generates an image signal as the test pattern TP to be described later. The image signal as the test pattern is processed in the image signal processor 11. The projection optical system 10 then projects a test pattern image.

The test pattern TP is a projection image for calibration of the projector 1 and is a projection image to be captured by the imaging device 2 to detect the pixel position in the projection image projected by the projector 1.

Particularly, in a case of the present exemplary embodiment, plural test patterns are prepared, and each of the plural test patterns is used as a pattern image capable of decoding identification information of each pixel in the projection image from images in which the plural test patterns are respectively captured. Specific examples of the test patterns TP will be described later.

The development information generator 15 generates development information based on a type of a test pattern to be projected and displayed and an instruction from the controller 14.

The development information is information that can be used in development processing in the information processing device 3 and includes interpolation direction information, which will be described in detail later.

The communication unit 16 is a portion that performs communication with a communication unit 26 in the information processing device 3 with respect to various kinds of data and control signals. Its communication method may be wired or wireless communication. Alternatively, as illustrated in FIG. 1B and FIG. 2B, when the projector 1 and the information processing device 3 are provided in the integrated device, it is sufficient if the communication is made through wire in the device.

The controller 14 controls an operation of the projector 1. For example, the controller 14 controls various kinds of processing in the image signal processor 11, operations of the liquid crystal panels and the lens in the projection optical system 10, test pattern generation in the test pattern generator 13, and communication conducted through the communication unit 16, and instructs the development information generator 15 to generate information.

The imaging device 2 includes an imaging unit 21, a controller 22, a development unit 23, a captured image decoder 24, a development information obtaining unit 25, a communication unit 26, and a storage 27.

In the example in FIG. 3, a section including the controller 22, the development unit 23, the captured image decoder 24, the development information obtaining unit 25, the communication unit 26, and the storage 27 is configured as the information processing device 3, but this configuration is an example.

The imaging unit 21 includes a lens system for imaging and the imaging element (imager) that photoelectrically converts subject light and outputs a captured image signal.

The imaging unit 21 captures the projection image projected on the screen 100 illustrated, for example, in FIG. 1A, and supplies the captured image signal to the development unit 23.

The controller 22 controls an imaging operation performed by the imaging unit 21.

Further, the controller 22 can perform control in such a manner that the imaging operation of the imaging unit 21 is performed at a timing detected through communication with the projector 1 through the communication unit 26. For example, it is also possible to control a field angle, an imaging direction, release timing, and the like of the imaging unit 21 in such a manner as to cause the imaging device 2 to automatically perform imaging at a timing when the test pattern is projected for calibration of the projector 1.

Furthermore, the controller 22 also gives instructions on processing in the development unit 23, storing and reproducing in the storage 27, processing in the captured image decoder 24, and processing in the development information obtaining unit 25.

The development unit 23 performs development processing on the captured image signal (RAW image signal) obtained by the imaging element in the imaging unit 21.

Specifically, for example, the development unit 23 is configured as an image processing processor with, for example, a DSP (Digital Signal Processor). The development unit 23 performs, for example, pre-processing, YC processing, interpolation processing, and codec processing as coding for recording or communication, with respect to the captured image signal by the imaging element, and generates developed image data.

Particularly, in FIG. 3, an interpolation processor 23a that performs the interpolation processing is illustrated in the development unit 23, and the interpolation processor 23a performs the interpolation processing of pixel information in an interpolation direction based on interpolation direction information according to the test pattern.

Note that the interpolation processor 23a does not necessarily have to be provided in the development unit 23 and may be formed by, for example, a processor different from a processor or the like configuring the development unit 23.

The storage 27 stores the developed image data. For example, in a case where many test patterns are to be projected sequentially, pieces of image data in which projection images of respective test patterns are captured are stored.

The captured image decoder 24 decodes the position information (the pixel numbers in the horizontal and vertical directions) of each pixel in the projection image, based on the pieces of captured image data of many test patterns. Position information Ddc generated with this decoding processing is used for calibration of the projector 1.

The communication unit 26 is a communication unit corresponding to the communication unit 16 in the projector 1.

The development information obtaining unit 25 extracts and obtains development information that can be used in the development processing from information that is transmitted from the projector 1 and is received by the communication unit 26. This development information includes the interpolation direction information. Operations of the development unit 23 and the captured image decoder 24 are controlled by the development information obtained by the development information obtaining unit 25.

In the present exemplary embodiment, the projector 1, the imaging device 2, and the information processing device 3 having the above-described functions are configured, for example.

Note that the information processing device 3 that includes at least the interpolation processor 23a or the information processing device 3 that further includes the development unit 23 and the development information obtaining unit 25 may be configured in the imaging device 2 or may be configured as an independent device as illustrated in FIG. 2A.

In such a case, the information processing device 3 may be implemented using a general-purpose personal computer. Further, the information processing device 3 can also be implemented using a mobile terminal device such as a smartphone. Any device can be applied to the information processing device 3 as long as the device has arithmetic processing ability. When an internally-provided arithmetic unit such as a microcomputer performs processing based on predetermined software, it is only required that at least a function as the interpolation processor 23a or further, functions as the development unit 23 and the development information obtaining unit 25 are implemented.

Note that, for example, the information processing device 3 may always be connected to the projector 1 online or may serve as an offline device at normal times and perform temporary communication with the projector 1.

Figure 4:
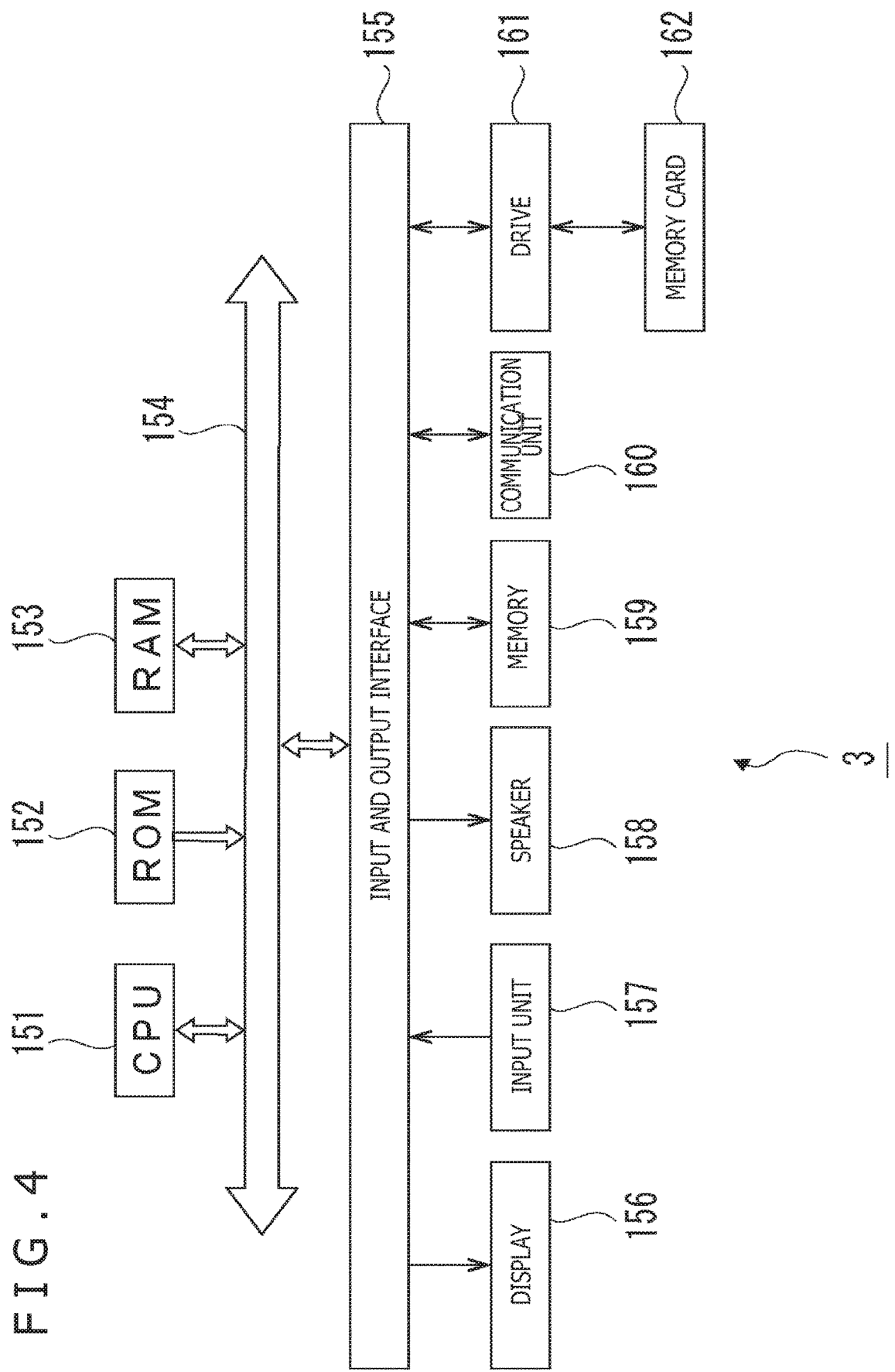
FIG. 4 is a block diagram of a hardware configuration of the information processing device according to the exemplary embodiment.

The information processing device 3 can be implemented with a hardware configuration as illustrated in FIG. 4, for example.

As illustrated in FIG. 4, the information processing device 3 includes a CPU 151, a ROM (Read Only Memory) 152, and a RAM (Random Access Memory) 153.

The CPU 151 performs various kinds of processing according to a program stored in the ROM 152 or a program loaded to the RAM 153 from a memory 159. The RAM 153 further stores data and the like necessary for the CPU 151 to perform the various kinds of processing, as appropriate.

The CPU 151, the ROM 152, and the RAM 153 are mutually connected through a bus 154. The bus 154 is further connected with an input and output interface 155.

The input and output interface 155 can be connected with a display 156 including, for example, a liquid crystal panel or an organic EL (Electroluminescence) panel, an input unit 157 including, for example, a keyboard and a mouse, a speaker 158, the memory 159 including, for example, an HDD (Hard Disk Drive), and the communication unit 160.

The display 156 may be integral with the information processing device 3 or may be an independent apparatus. The display 156 displays the captured image, an arithmetic result, or an operation menu, for example.

The input unit 157 means an input device to be used by a user who uses the information processing device 3 (e.g., an adjustment operator of the projection system).

The communication unit 160 performs wired or wireless communication with peripheral apparatuses.

The communication unit 160 may perform communication processing through a network including the Internet, to enable download of necessary software or transmission of various kinds of information, for example.

The input and output interface 155 is further connected with a drive 161 as needed. A memory card 162 is mounted on the drive 161, and a computer program read out from the memory card 162 is installed in the memory 159, or data processed by the CPU 151 is stored in the memory card 162, as needed. Needless to say, the drive 161 may be a recording and reproducing drive for a removable storage medium such as a magnetic disk, an optical disk, or a magneto-optical disk.

As described above, the information processing device 3 includes a hardware configuration as a computer device.

Note that the information processing device 3 according to the exemplary embodiment is not limited to the computer device as illustrated in FIG. 4 in which the information processing device 3 is configured with the computer device having the hardware configuration solely, and the information processing device 3 may be configured by systemizing a plurality of computer devices. The plurality of computer devices may be systemized with, for example, a LAN (Local Area Network), or may be disposed at a remote area with, for example, a VPN (Virtual Private Network) using, for example, the Internet. The plurality of computer devices may include a computer device that can be used by a cloud computing service.

The computer device having the configuration as illustrated in FIG. 4 can be implemented as a personal computer of a desktop type or a notebook type or a mobile terminal such as a tablet terminal or a smartphone. Further, even an electronic apparatus such as a dedicated device, a monitor device, or a facility management device, which has functions as the computer device, can be equipped with a function as the information processing device 3 according to the present exemplary embodiment. For example, as illustrated in FIG. 2A, in a case where the information processing device 3 is provided separately from the imaging device 2, the abovementioned devices can implement the information processing device 3 according to the present exemplary embodiment.

Furthermore, in a case of the configurations in FIG. 1A, FIG. 1B, and FIG. 2B, the information processing device 3 may include at least the CPU 151, the ROM 152, the RAM 153, and the input and output interface 155 in FIG. 4, for example, and may transmit and receive information with the imaging device 2 and the projector 1 through the input and output interface 155.

<2. Interpolation Processing Upon Detection of Pixel Position by Use of Test Patterns>

Detection of a pixel position by use of test patterns in the projection system of the present exemplary embodiment having the above-described configuration and interpolation processing upon development for the detection will be described.

Figure 5:
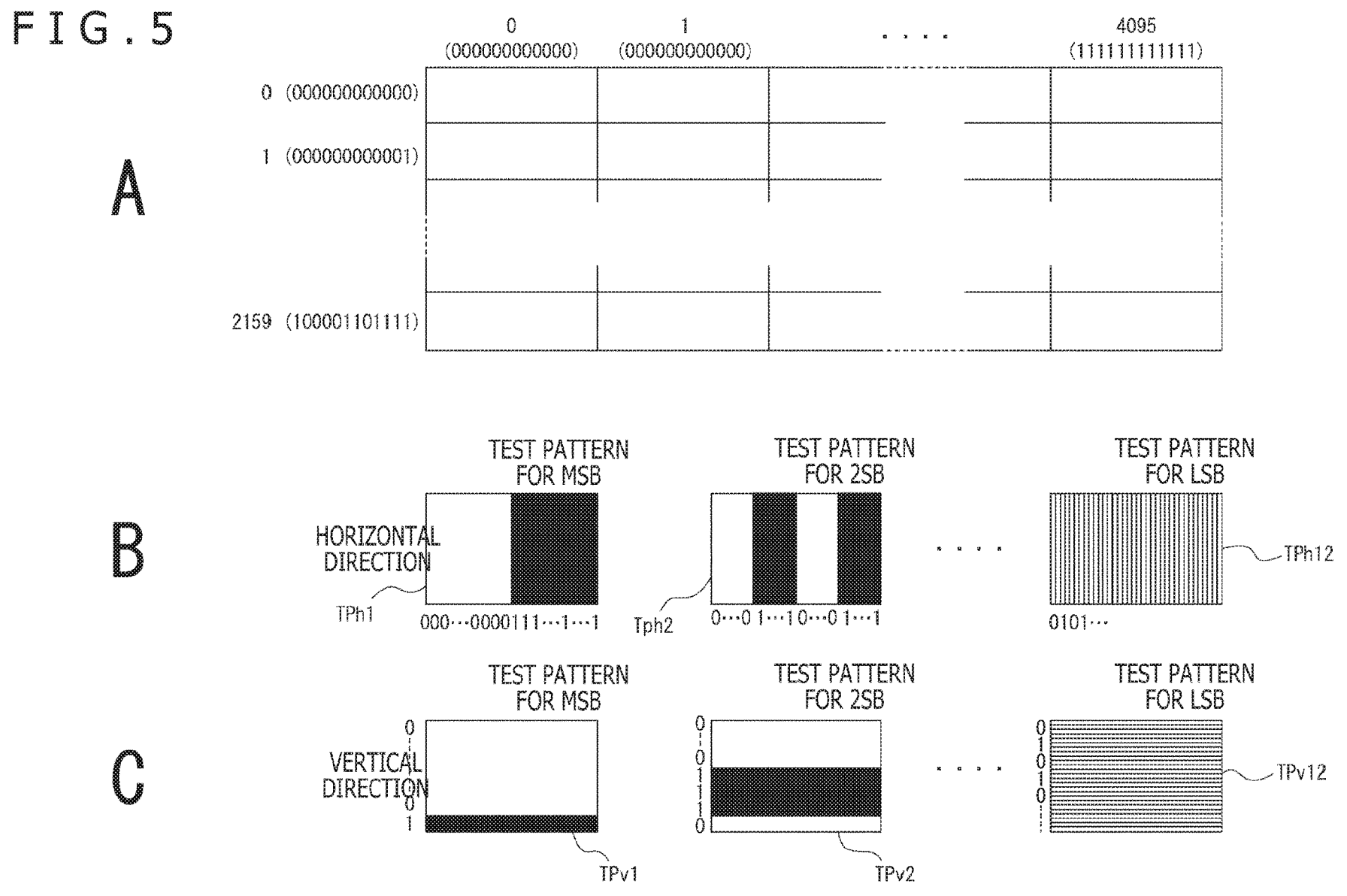

First, with reference to FIG. 5, test patterns for detecting the pixel position in the projection image will be described.

FIG. 5A schematically illustrates a configuration of, for example, horizontal 4,096 pixels×vertical 2,160 pixels as the projection image. The numbers of pixels are examples.

For example, in order to detect a projection position of each pixel in such a projection image from a captured image, only detection of identification information of each pixel from the captured image is needed. For example, only detection of pixel numbers in horizontal and vertical directions is needed.

In a case where the numbers of pixels in FIG. 5A are used, for example, pixel numbers 0 to 4,095 in the horizontal direction can be expressed with 12 bits of "000000000000" to "111111111111." Further, pixel numbers 0 to 2,159 in the vertical direction can be expressed with 12 bits of "000000000000" to "100001101111."

Therefore, 12 test patterns TP that can express 12 bits for each of the horizontal and vertical directions are prepared, for example.

FIG. 5B illustrates test patterns TPh1 to TPh12 for detecting a horizontal pixel number.

First, the test pattern TPh1 is an image configured by collecting MSBs (most significant bits) of "000000000000" to "111111111111" as the horizontal pixel numbers 0 to 4,095.

In other words, the test pattern TPh1 is an image in which 4,096 MSBs are aligned such as "000 . . . 000111 . . . 111," "0" is represented to be white, and "1" is represented to be black. Since each of MSBs of left half pixels is "0" and each of MSBs of right half pixels is "1," the test pattern TPh1 turns to be an image in which a white part and a black part are horizontally separated from each other as illustrated in FIG. 5B.

Next, the test pattern TPh2 is an image configured by collecting second bits from uppermost digits of the horizontal pixel numbers of "000000000000" to "111111111111" (expressed as "2SB" (2nd significant bit), for explanation) in a similar manner. The test pattern TPh2 turns to be an image in which white parts and black parts are alternately aligned in a horizontally separated manner for each ¼ of the number of pixels as illustrated in FIG. 5B.

The test patterns TPh3, TPh4, . . . , and TPh11 are not illustrated, but turn to be patterns in which third bits, fourth bits, . . . , and eleventh bits are respectively aligned in a similar manner. In those images, vertical stripes gradually become thin.

The last test pattern TPh12 is an image configured by collecting LSBs (least significant bits) of the horizontal pixel numbers of "000000000000" to "111111111111." The test pattern TPh12 turns to be an image having finest vertical stripes in which white parts and black parts are alternated for each pixel, that is, "010101 . . . 0101."

FIG. 5C illustrates test patterns TPv1 to TPv12 for detecting a vertical pixel number. Those are also image patterns formed with the idea similar to that for the above-described horizontal direction.

The test pattern TPv1 is an image configured by collecting MSBs of "000000000000" to "100001101111" as the vertical pixel numbers 0 to 2,159.

The test pattern TPv2 is an image configured by collecting 2SBs of the vertical pixel numbers of "000000000000" to "100001101111."

The test patterns TPv3, TPv4, . . . , and TPv11 are not illustrated, but turn to be patterns in which third bits, fourth bits, . . . , and eleventh bits are respectively aligned in a similar manner. In those images, horizontal stripes gradually become thin.

The last test pattern TPv12 is an image configured by collecting LSBs of the vertical pixel numbers of "000000000000" to "100001101111." The test pattern TPv12 turns to be an image having finest horizontal stripes in which white parts and black parts are alternated for each pixel, that is, "010101 . . . 0101."

In this manner, a total of 24 test patterns TP are prepared.

Figure 6:
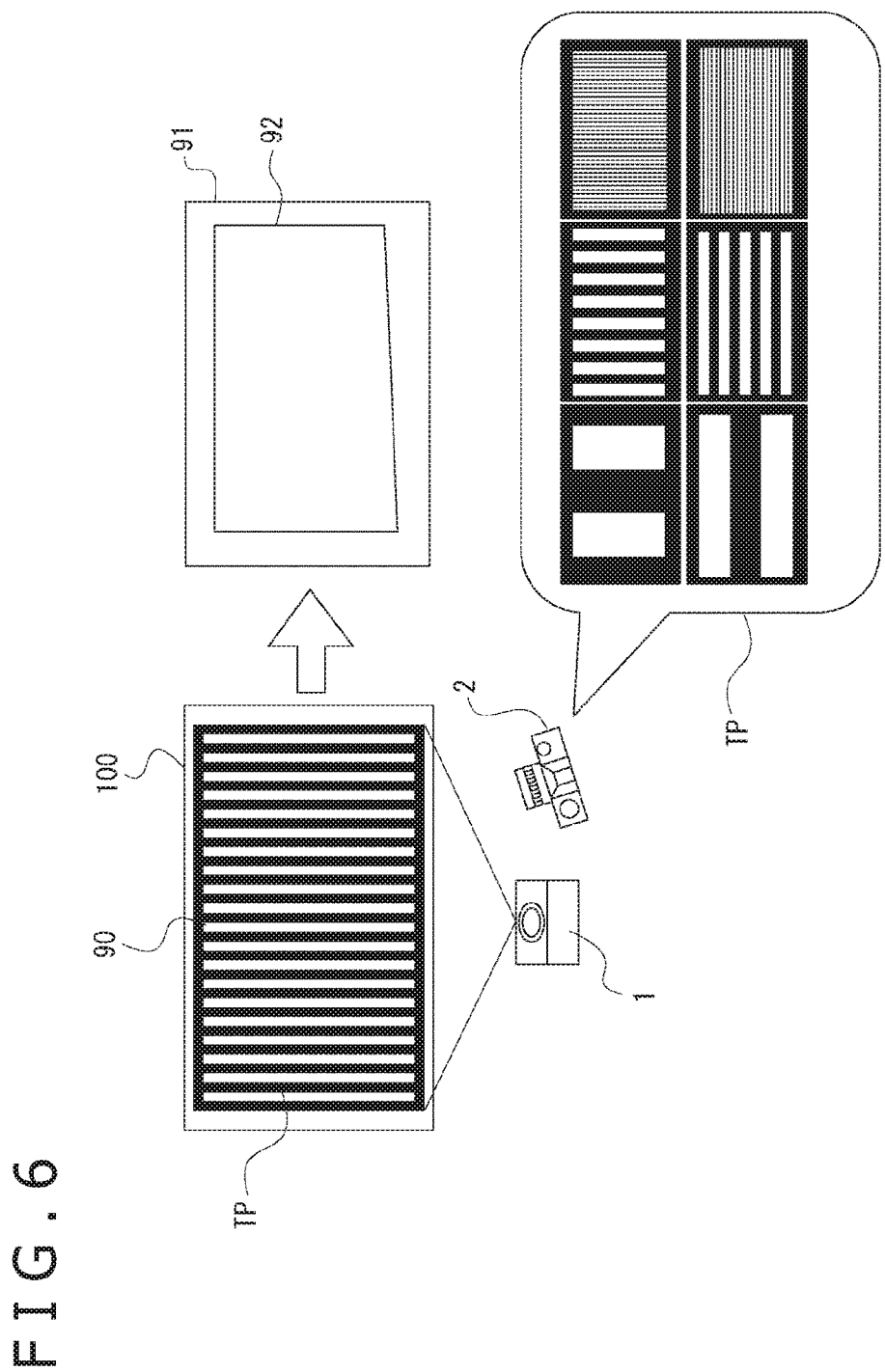
FIG. 6 is an explanatory diagram of sensing of the test pattern performed in the exemplary embodiment.

As schematically illustrated in FIG. 6, the test patterns TP are sequentially projected on the screen 100. The projection image 90 indicates each one of the test patterns TP.

The imaging device 2 captures the projection image 90, and the information processing device 3 performs the development processing on the captured image to obtain the captured image data 91.

Geometric distortion occurs in the projection image projected by the projector 1. Further, the imaging device 2 does not necessarily properly face the projector 1, and the optical system also has distortion. Therefore, the captured image does not perfectly have the same shape as the original test pattern TP.

To address this issue, a position, on the captured image data 91, of each pixel in the projection image 90 is detected to secure correspondence.

When 24 test patterns described above are projected and captured while a positional relation between the projector 1 and the imaging device 2 and adjustment states thereof are kept, 24 pieces of captured image data 91 can be obtained. In each piece of the captured image data 91, each of images 92 of test patterns TP having an identical shape is captured.

At this time, respective black and white patterns of 12 test patterns TPh1 to TPh12 for horizontal position detection are decoded, whereby values of 0 to 4,095 can be detected. In other words, at which position on the captured image data 91 the horizontal pixel position is can be detected.

Similarly, respective black and white patterns of 12 test patterns TPv1 to TPv12 for vertical position detection are decoded, whereby values of 0 to 2,159 can be detected. In other words, at which position on the captured image data 91 the vertical pixel position is can be detected.

When those detection results are combined, positions (corresponding points), on the captured image data 91, of all pixels in the projection image can be detected.

In this manner, the positions of the pixels in the projection image are corresponded on the captured image data 91. This allows precise calibration using the captured image data 91.

However, the above processing is based on a premise that the captured image data 91 in which the test patterns TP ranging from the MSB to the LSB are precisely represented is obtained.

Yet, in an actual case, sensing accuracy is deteriorated due to the artifact upon imaging.

Upon the development processing, the interpolation direction is detected from the captured image, and the interpolation processing is performed by adaptively selecting the interpolation direction, thereby maintaining or improving resolution. This is because the sensing accuracy is lowered when no interpolation processing is performed.

However, when detection of the interpolation direction is erroneously performed, the artifact may occur. Particularly, for example, failure is likely to occur in the direction detection of a uniform high-frequency pattern image, such as the test pattern TPv12 or TPh12 for the LSB.

Figure 7:
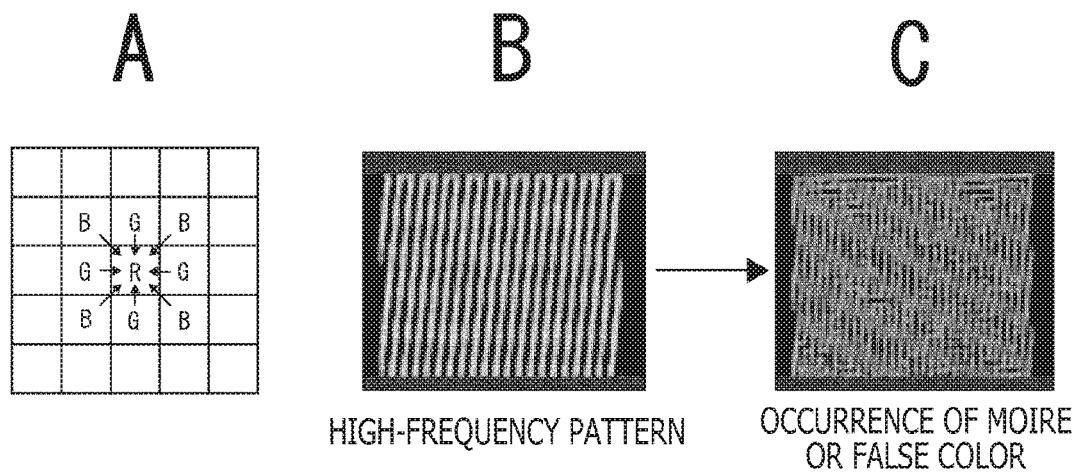
FIG. 7 depicts explanatory diagrams of an artifact caused by erroneous interpolation processing.

FIG. 7 schematically illustrates erroneous interpolation processing. For example, FIG. 7A illustrates the interpolation processing that interpolates "B (blue)" and "G (green)" components that are lacking in a central R (red) pixel from peripheral pixels, in pixels of a Bayer array.

In this case, when the interpolation processing is performed on a high-frequency pattern as illustrated in FIG. 7B, for example, moire and false color occur as illustrated in FIG. 7C.

The test patterns TPv12 and TPh12 for the LSBs are patterns in which 0 and 1 are alternated for each pixel. One error in the white or black pattern causes a pixel to have a pixel number of that of a neighboring pixel.

In this manner, erroneous interpolation processing degrades accuracy of the pixel position to be detected, thereby hindering accurate calibration, in some cases.

To address this issue, in the present exemplary embodiment, the development information obtaining unit 25 in the information processing device 3 receives development information for each test pattern TP from the projector 1. The development unit 23 then performs the development processing on the captured image of each test pattern TP based on the development information thus received. Specifically, the interpolation processor 23*a* in the development unit 23 determines the interpolation direction, based on the interpolation direction information included in the development information thus received.

For example, in a case where the projector 1 projects the test pattern TPh12 having vertical correlation as illustrated in FIG. 8A, the projector 1 generates information indicating that the vertical direction serves as a correlation direction and is an appropriate interpolation processing direction, and transmits the information to the information processing device 3. When obtaining the interpolation direction information, the information processing device 3 performs vertical interpolation on the captured image as illustrated in FIG. 8B. In other words, the information processing device 3 performs the interpolation processing using two pixels vertically adjacent to the target pixel (or, three or more pixels aligned in the vertical direction).

Similarly, in a case where the projector 1 projects the test pattern TPv12 having horizontal correlation as illustrated in FIG. 8C, the projector 1 generates information indicating that the horizontal direction serves as the correlation direction and is the appropriate interpolation processing direction, and transmits the information to the information processing device 3. When obtaining the interpolation direction information, the information processing device 3 performs horizontal interpolation on the captured image as illustrated in FIG. 8D. In other words, the information processing device 3 performs the interpolation processing using two pixels horizontally adjacent to the target pixel (or, three or more pixels aligned in the horizontal direction).

As described above, the development unit 23 adaptively switches the interpolation direction according to the correlation information of the test pattern TP.

This allows high-resolution information to be obtained. As a result, coordinates of the projection image of the projector can be calculated with high accuracy.

For example, FIG. 9B illustrates the captured image data 91 in which the test pattern TP in FIG. 9A is captured and the captured image is developed. Enlarged views of a region 95 surrounded by a broken line in FIG. 9B are illustrated in FIG. 9C and FIG. 9D. FIG. 9C is an example of the present exemplary embodiment and illustrates a case where the interpolation processing is performed based on the interpolation direction information. FIG. 9D illustrates a case where the uniform interpolation as illustrated in FIG. 7A is performed as a comparative example.

In the case of FIG. 9D as the comparative example, the stripes in the test pattern TP are crushed. In contrast, in the case of FIG. 9C as the present exemplary embodiment, the stripe pattern is precisely developed.

Further, the development unit 23 occasionally performs noise reduction processing. In the noise reduction processing, noise is reduced by performing smoothing between peripheral pixels.

Also in this case, according to the interpolation direction information indicating the correlation direction, smoothing processing is performed along the correlation direction, whereby noise can be reduced without losing details.

In FIG. 10, improved sensing accuracy by performance of the interpolation processing as in the exemplary embodiment is compared with sensing accuracy of the comparative example.

The comparative example is a case where uniform interpolation is performed, and the exemplary embodiment is a case where the vertical interpolation or the horizontal interpolation as illustrated in FIG. 8 is adaptively performed.

For simplicity of explanation, the coordinate system is handled in a one-dimensional form as illustrated in a column C1.

In the sensing of the position information, coordinates in a coordinate system of the projection image projected by the projector 1 (column C2) correspond to coordinates on the captured image (column C1).

A true value of the coordinate system of the projection image has fractional precision.

Data in which coordinate information is binarized (test pattern TP) is projected by the projector 1, and bit data of sensed data that is obtained with the method of the comparative example (column C3 to column C6) and bit data of sensed data that is obtained with the exemplary embodiment (column C9 to column C12) are illustrated in FIG. 10.

In the method of the comparative example, data of LSBs (column C6) largely varies, and therefore, errors (column C8) between correct values (column C2) and coordinate values (column C7) obtained by decoding bit data in the column C3 to the column C6 from a binary number to a decimal number are large. A square sum of the errors indicated below the column C8 turns to be 13.96. On the other hand, in the method of the exemplary embodiment, data of LSBs (column C12) is stably obtained, and therefore errors (column C14) between the correct values (column C2) and coordinate values (column C13) obtained by decoding bit data in the column C9 to the column C12 from a binary number to a decimal number are small. A square sum of the errors indicated below the column C14 turns to be a small value, that is, 1.33.

As described above, when the interpolation method of the exemplary embodiment is used, the sensing accuracy is remarkably improved.

<3. Processing Procedure>

FIG. 11 illustrates a processing example of the projector 1 and the imaging device 2 (including the information processing device 3) in the configuration example in FIG. 3 of the exemplary embodiment.

In FIG. 11, processing in the projector 1 is illustrated on a left side, and processing in the imaging device 2 and the information processing device 3 is illustrated on a right side.

The description will be made of a case where 12 test patterns that are the test patterns TPh1 to TPh12 and TPv1 to TPv12, which are explained with reference to FIG. 5B and FIG. 5C, are used as the test patterns TP.

In the processing in the projector 1, the horizontal processing and the vertical processing are performed as a loop processing LP1. Furthermore, steps S101 to S104 are performed 12 times in each of the horizontal and vertical directions as a loop processing LP2 in the loop processing LP1.

For example, first, projection for horizontal position detection is performed as a first loop processing LP1. In this case, in the loop processing LP2 to be performed 12 times, processing for sequentially projecting the test patterns TPh1 to TPh12 is performed.

Next, projection for vertical position detection is performed as a second loop processing LP1. In this case, in the loop processing LP2 to be performed 12 times, processing for sequentially projecting the test patterns TPv1 to TPv12 is performed.

The controller 14 in the projector 1 first selects the test pattern in step S101. In other words, the controller 14 selects the test pattern TP in the above-described order and instructs the test pattern generator 13 to output the selected test pattern TP.

In step S102, the controller 14 causes the image signal processor 11 and the projection optical system 10 to project the test pattern.

In step S103, the controller 14 controls information transmission.

The controller 14 transmits information indicating that the test pattern TP is projected to the imaging device 2. In other words, the abovementioned information is information for giving notice of an imaging timing for the imaging device 2.

At this time, the controller 14 causes the development information generator 15 to generate development information including the interpolation direction information corresponding to the correlation direction according to the test pattern TP selected in step S101 and causes the communication unit 16 to transmit the generated information to the information processing device 3.

Note that, in the loop processing LP2 to be performed 12 times during a period of time in which the horizontal direction processing is performed as the loop processing LP1, since the test patterns TPh1 to TPh12 that are the vertical stripe images are sequentially selected and projected, the correlation direction is always the vertical direction during this period of time. Accordingly, in step S103 to be performed 12 times in this period of time, the vertical direction is indicated as the interpolation direction information every time.

Alternatively, when the information processing device 3 is provided with an algorithm that interprets that the correlation direction is the same as a previous one unless the interpolation direction information is otherwise specifically provided, the interpolation direction information indicating the vertical direction may be transmitted at only the first time of 12 times.

Alternatively, information meaning "the same as the previous one" may be transmitted at the second time and subsequent times.

On the other hand, in the loop processing LP2 to be performed 12 times during a period of time in which the vertical direction processing is performed as the loop processing LP1, since the test patterns TPv1 to TPv12 that are the horizontal stripe images are sequentially selected and projected, the correlation direction is always the horizontal direction during this period of time. Accordingly, in step S103 to be performed 12 times in this period of time, the horizontal direction is indicated as the interpolation direction information every time. Alternatively, when the information processing device 3 can interpret that the correlation direction is the same as a previous one, the interpolation direction information indicating the horizontal direction may be transmitted at only the first time of 12 times. Alternatively, information meaning "the same as the previous one" may be transmitted at the second time and subsequent times.

Note that, at this time, the controller 14 may include blur amount information in the development information, in addition to the interpolation direction information.

The controller 14 can obtain the information regarding a blur amount of the projection pattern by using focus control information for the projection optical system 10, whereby this blur amount information can also be transmitted to the information processing device 3 as one piece of the development information, together with the interpolation direction information.

Alternatively, the controller 14 may transmit other information to the information processing device 3 in addition to the development information to be used for the development processing.

For example, the controller 14 may transmit brightness (gain) information of the projection image.

Furthermore, it is possible that the controller 14 transmits model information of the projector 1.

Note that those pieces of information do not change particularly for each test pattern TP, whereby it is not necessary to transmit those pieces of information every time in step S103 in the loop processing LP2. For example, those pieces of information are only required to be transmitted once at first.

In step S104, the controller 14 waits for development completion in the information processing device 3. When receiving notification of the development completion from the information processing device 3, the controller 14 finishes one piece of processing in the loop processing LP2.

Accordingly, the controller 14 of the projector 1 projects one test pattern TP, then confirms that the information processing device 3 has completed this development processing on the test pattern TP, and shifts to projection of the next test pattern TP.

Also in the processing in the imaging device 2 and the information processing device 3, the horizontal direction processing and the vertical direction processing are performed as a loop processing LP3. Further, steps S201 to S208 are performed 12 times in each of the horizontal direction and the vertical direction as a loop processing LP4 in the loop processing LP3.

In step S201, the controller 22 in the imaging device 2 (information processing device 3) waits for the projection of the test pattern TP by the projector 1.

As described above, the projector 1 transmits notification of the projection of the test pattern TP in the processing in step S103. When the controller 22 recognizes this notification, the processing in the controller 22 proceeds from step S201 to step S202. The controller 22 instructs the development information obtaining unit 25 to obtain the development information also transmitted from the projector 1.

With this instruction, the development information obtaining unit 25 reads the development information, particularly, the interpolation direction information, from the received information, and supplies this information to the controller 22.

Note that, when the blur amount information is included as the development information, the development information obtaining unit 25 also reads out the blur amount information and supplies the information to the development unit 23.

Further, when the brightness (gain) information of the projection image and the model information of the projector 1 are included as the received information, the controller 22 reads out those pieces of the information to obtain them.

In step S203, the controller 22 causes the imaging unit 21 to perform imaging. This allows the projection image of the test pattern TP to be captured.

Note that, in a case where the brightness (gain) information is obtained from the controller 14 in the projector 1, the controller 22 can perform highly-accurate exposure control of the imaging unit 21 according to the brightness information.

The controller 22 can also perform the exposure control according to the model information of the projector 1.

In step S204, the controller 22 causes the processing to branch according to the correlation direction indicated as the interpolation direction information.

In a case where the horizontal direction is indicated as the correlation direction, the controller 22 proceeds to step S205, and instructs the interpolation processor 23a to perform the horizontal interpolation processing upon performance of the development processing by the development unit 23.

At this time, the controller 22 may instruct the development unit 23 to use the horizontal direction as the smoothing direction in the noise reduction processing.

In a case where the vertical direction is indicated as the correlation direction, the controller 22 proceeds to step S206, and instructs the interpolation processor 23a to perform the vertical interpolation processing upon performance of the development processing by the development unit 23.

At this time, the controller 22 may instruct the development unit 23 to use the vertical direction as the smoothing direction in the noise reduction processing.

Further, in both cases of steps S205 and S206, in a case where the blur amount information of the projection pattern is obtained, the controller 22 can instruct the development unit 23 to perform blur restoring processing with appropriate strength according to the blur amount.

In addition, the controller 22 can control strength of degradation restoring processing to be performed by the development unit 23 according to the model information of the projector 1.

Next, the controller 22 proceeds to step S207 and causes the storage 27 to store the captured image data obtained by performance of the development processing by the development unit 23.

In step S208, the controller 22 transmits notification of development completion to the controller 14 in the projector 1.

As described above, processing of step S201 to step S208 as the loop processing LP4 is performed in conjunction with the operation in the projector 1.

With this processing, when the projector 1 sequentially projects 24 test patterns TP, the imaging device 2 sequentially performs imaging and development, whereby 24 pieces of captured image data are stored in the storage 27.

When terminating the above processing, the controller 22 proceeds to step S210 and reads out 24 pieces of captured image data from the storage 27 to perform decode processing.

With this processing, the position information of each pixel in the projection image (the pixel numbers in the horizontal and vertical directions) can be obtained from the captured image data, and the corresponding point, on the captured image data, of each pixel in the projection image can be detected.

In the above-described processing, the interpolation processing is performed according to the correlation direction of the image, thereby improving accuracy of the position information sensing.

<4. Summary and Modifications>

The following effects can be obtained by the present exemplary embodiment described above.

The information processing device 3 according to the exemplary embodiment includes the interpolation processor 23a that performs the interpolation processing of the pixel information in the interpolation direction based on the interpolation direction information according to the test pattern TP projected by the projector 1 (projection device), with respect to the image signal obtained by capturing the projection image of the test pattern TP.

As a more specific example, the information processing device 3 includes the development information obtaining unit 25 (information obtaining unit) that obtains the interpolation direction information according to the test pattern TP projected by the projector 1, and the development unit 23 that includes the interpolation processor 23a and performs the development processing including the interpolation processing of the pixel information in the interpolation direction according to the interpolation direction information obtained by the development information obtaining unit 25, with respect to the image signal obtained by capturing the projection image of the test pattern projected by the projector 1.

This can achieve the interpolation processing in the appropriate interpolation direction which does not degrade the image, such that the interpolation is performed in the horizontal direction in a case of the test pattern having horizontal correlation by including, for example, the horizontal stripes.

As a result, the degradation of the development image due to, for example, occurrence of the artifact can be prevented.

Accordingly, the sensing of the test pattern can be performed with high accuracy. Particularly, in the sensing of the test patterns for the LSBs (TPv12, TPh12), "crush" due to the interpolation can be eliminated, and even the LSB patterns can accurately be sensed. In other words, the sensing with a reduced error and high resolution can be performed.

Further, when the interpolation processing is not performed in the development processing, the resolution is degraded, in some cases. However, in the case of the present exemplary embodiment, the artifact due to the interpolation processing can be avoided, thereby canceling the degradation of the resolution due to performance of the interpolation processing. Therefore, the interpolation processing can be utilized, and further, the degradation of the resolution of the development image can be avoided.

From those effects, the accuracy of the calibration of the projector by use of the sensing result of the test patterns can be improved.

In addition, in the case of the exemplary embodiment, detection of the interpolation direction from the captured image does not have to be performed, thereby reducing a load of the development processing.

In the exemplary embodiment, the plural test patterns TP are prepared, and each test pattern (TPh1 to TPh12, TPv1 to TPv12) is used as the pattern image capable of decoding the identification information of each pixel in the projection image, from the images in which those test patterns are respectively captured. The projector 1 sequentially projects the plural test patterns. In response to this, when the projector 1 projects each of the plural test patterns, the development information obtaining unit 25 obtains the interpolation direction information according to the test pattern to be projected (S202 in FIG. 11).

With this operation, even in the case where the plural test patterns having different pattern images are used, the interpolation processing in the appropriate interpolation direction according to the correlation direction of each test pattern can be performed.

The information processing device 3 according to the exemplary embodiment includes the captured image decoder 24 that decodes the identification information of each pixel in the projection image by use of the image signals with respect to which the interpolation processor 23a has performed the interpolation processing (i.e., with respect to which the development unit 23 has performed the development processing) and that respectively correspond to the plural test patterns TP.

With this configuration, the identification information (pixel values in the horizontal and vertical directions) of each pixel in the projection image can be obtained as information to be used for the calibration of the projector.

Particularly, the interpolation processing upon the development is performed in the interpolation direction according to the correlation direction, thereby also improving accuracy of the identification information to be decoded.

In the exemplary embodiment, the interpolation direction information is defined as information indicating whether the direction of the pixel correlation is the horizontal direction or the vertical direction.

As the test patterns TP, the pattern images (TPv1 to TPv12) having the horizontal stripes and the pattern images (TPh1 to TPh12) having the vertical stripes are illustrated. Those patterns are suitable for pixel-number expression of pixels arranged in the horizontal and vertical directions as a matrix.

Further, in this case, the direction of the pixel correlation (correlation direction) is the horizontal direction in the case of the pattern images having the horizontal stripes is the horizontal direction, and the vertical direction in the case of the pattern images having the vertical stripes. The interpolation direction information indicates such a correlation direction. This allows the information processing device 3 to grasp the direction of the pixel correlation for each test pattern.

In the exemplary embodiment, the interpolation processor 23a performs the vertical interpolation processing using pixels aligned in the vertical direction in a case where the interpolation direction information indicates the vertical direction (S206), and performs the horizontal interpolation processing using pixels aligned in the horizontal direction in a case where the interpolation direction information indicates the horizontal direction (S205).

In other words, whether the direction of the pixel correlation is the vertical direction or the horizontal direction is recognized, and the vertical interpolation processing or the horizontal interpolation processing is performed according to the recognized result.

The interpolation processing is achieved as follows. For example, as illustrated in FIG. 5C, in a case of the test patterns having the horizontal stripes (i.e., the test patterns TPv1 to TPv12 for obtaining the vertical pixel number), the horizontal interpolation is performed. Further, as illustrated in FIG. 5B, in a case of the test patterns having the vertical stripes (i.e., the test patterns TPh1 to TPh12 for obtaining the horizontal pixel number), the vertical interpolation is performed.

In this case, image degradation due to the artifact can be prevented by performance of the interpolation processing in the correlated direction, and therefore, the development image with excellent accuracy can be obtained.

By limiting the correlation direction of the images of the test patterns TP to the horizontal direction or the vertical direction, the interpolation processing may also select one of the horizontal interpolation or the vertical interpolation each time. This does not lead to a large processing load.

It has been described that the development unit 23 in the exemplary embodiment performs the smoothing processing for noise reduction in the interpolation direction according to the interpolation direction information.

The smoothing for the noise reduction is also performed between pixels aligned in the pixel correlation direction, whereby crush of information can be avoided.

Therefore, the noise reduction processing can effectively be utilized, and further, development quality can be improved.

Note that, other than the interpolation processing and the noise reduction processing, processing to be suitably performed in the correlation direction preferably switches a processing direction adaptively according to the interpolation direction information.

In the exemplary embodiment, the development information obtaining unit 25 is caused to obtain the interpolation direction information transmitted through communication with the projector 1.

Accordingly, the information processing device 3 in the exemplary embodiment only needs to be communicable with the projector 1. With this configuration, the interpolation direction information can be obtained according to the test pattern TP and can be reflected on the development processing.

As an example, it has been described that the development information obtaining unit 25 in the exemplary embodiment obtains the information regarding the projector 1, and supplies the obtained information to the controller 22 to control the development unit 23 and the imaging unit 21 that performs imaging.

For example, the development information obtaining unit 25 obtains the brightness information of the projection image, the focus information, and the model information as the information regarding the projector 1.

Use of those pieces of information enables the imaging processing or the development processing according to a condition of the projector 1 or a projection state to be performed, whereby more accurate development image can be obtained.

The technique of the present disclosure is not limited to the example in the exemplary embodiment.

The present technique is not limited to the projector 1 of the transmission type or using a reflection type liquid crystal panel and is applicable to a light emission type projection device.

The program in the exemplary embodiment is a program that causes the information processing device 3 that performs the interpolation processing on the captured image signal to perform the interpolation processing of the pixel information in the interpolation direction based on the interpolation direction information according to the test pattern TP projected by the projection device (projector 1), with respect to the image signal obtained by capturing the projection image of the test pattern TP.

As a more specific example, the program causes the information processing device 3 that performs the development processing on the captured image signal to perform the processing for obtaining the interpolation direction information according to the test pattern TP projected by the projector 1 (S202), and the development processing including the interpolation processing of the pixel information in the interpolation direction according to the obtained interpolation direction information, with respect to the image signal obtained by capturing the projection image of the test pattern TP projected by the projector 1 (S205, S206).

In other words, the program causes the information processing device 3 and the CPU 151 in FIG. 4 to perform the processing in FIG. 11.

Such a program facilitates implementation of the information processing device 3 of the present exemplary embodiment.

Such a program can be stored in, for example, a recording medium incorporated in an apparatus such as a computer device, or a ROM in a microcomputer including a CPU, in advance. Alternatively, such a program can be temporarily or permanently stored (retained) in a removable recording medium such as a semiconductor memory, a memory card, an optical disk, a magneto-optical disk, and a magnetic disk.

Such a removable recording medium can be provided as what is generally called package software.

Alternatively, such a program can be installed from the removable recording medium to, for example, a personal computer, or can be downloaded from a download site through a network such as a LAN or the Internet.

Note that effects described in the present specification are illustrative in nature and are not limitative. Other effects may be provided.

Note that the present technology can also adopt the following configurations.

(1)

An information processing device including:

an interpolation processor that performs interpolation processing of pixel information in an interpolation direction based on interpolation direction information according to a test pattern projected by a projection device, with respect to an image signal obtained by capturing a projection image of the test pattern.

(2)

The information processing device according to the above item (1), in which, in a case where the test patterns are prepared in plural number, each of the plural test patterns is used as a pattern image capable of decoding identification information of each pixel in the projection image from images in which the plural test patterns are respectively captured, and the projection device sequentially projects the plurality of the test patterns, when the projection device projects each of the plural test patterns, the interpolation processor performs the interpolation processing of the pixel information in the interpolation direction based on the interpolation direction information according to each of the plural test patterns to be projected.

(3)

The information processing device according to the above item (1) or (2), further including:

a captured image decoder that decodes the identification information of each pixel in the projection image, by using image signals with respect to which the interpolation processor has performed the interpolation processing and that respectively correspond to the plural test patterns.

(4)

The information processing device according to any one of the above items (1) to (3), in which the interpolation direction information includes information indicating whether a direction of pixel correlation is a horizontal direction or a vertical direction.

(5)

The information processing device according to the above item (4), in which the interpolation processor performs vertical interpolation processing using pixels aligned in the vertical direction in a case where the interpolation direction information indicates the vertical direction, and performs horizontal interpolation processing using pixels aligned in the horizontal direction in a case where the interpolation direction information indicates the horizontal direction.

(6)

The information processing device according to any one of the above items (1) to (5), further including:

a development unit that performs smoothing processing for noise reduction in the interpolation direction according to the interpolation direction information.

(7)

The information processing device according to any one of the above items (1) to (6), further including:

an information obtaining unit that obtains the interpolation direction information according to the test pattern projected by the projection device.

(8)

The information processing device according to the above item (7), in which the information obtaining unit obtains the interpolation direction information transmitted through communication with the projection device.

(9)

The information processing device according to the above item (7) or (8), in which the information obtaining unit obtains information regarding the projection device and uses the information to control the interpolation processor or an imaging unit that performs imaging.

(10)

An information processing method performed by an information processing device that performs interpolation processing on a captured image signal, the information processing method including:

performing the interpolation processing of pixel information in an interpolation direction based on interpolation direction information according to a test pattern projected by a projection device, with respect to an image signal obtained by capturing a projection image of the test pattern.

(11)

A program that causes an information processing device that performs interpolation processing on a captured image signal to perform:

the interpolation processing of pixel information in an interpolation direction based on interpolation direction information according to a test pattern projected by a projection device, with respect to an image signal obtained by capturing a projection image of the test pattern.

REFERENCE SIGNS LIST

1 . . . Projector, 2 . . . Imaging device, 3 . . . Information processing device, 10 . . . Projection optical system, 11 . . . Image signal processor, 12 . . . Image input unit, 13 . . . Test pattern generator, 14 . . . Controller, 15 . . . Development information generator, 16 . . . Communication unit, 21 . . . Imaging unit, 22 . . . Controller, 23 . . . Development unit, 23a . . . Interpolation processor, 24 . . . Captured image decoder, 25 . . . Development information obtaining unit, 26 . . . Communication unit, 27 . . . Storage

The invention claimed is:

1. An information processing device comprising:

an interpolation processor configured to perform interpolation processing of pixel information in an interpolation direction based on interpolation direction information according to at least one test pattern projected by a projection device, with respect to an image signal obtained by capturing a projection image of the at least one test pattern, wherein, when the at least one test pattern includes a plurality of test patterns, each test pattern of the plurality of test patterns is used as a pattern image capable of decoding identification information of each pixel in the projection image from images in which the plurality of test patterns are respectively captured.

2. The information processing device according to claim 1,
wherein, when the projection device projects each of the plurality of test patterns, the interpolation processor performs the interpolation processing of the pixel information in the interpolation direction based on the interpolation direction information according to each of the plurality of test patterns to be projected.

3. The information processing device according to claim 2, further comprising:
a captured image decoder configured to decode the identification information of each pixel in the projection image, by using image signals with respect to which the interpolation processor has performed the interpolation processing and that respectively correspond to the plurality of test patterns,
wherein the captured image decoder is implemented via at least one processor.

4. The information processing device according to claim 1,
wherein the interpolation direction information includes information indicating whether a direction of pixel correlation is a horizontal direction or a vertical direction.

5. The information processing device according to claim 4,
wherein the interpolation processor is further configured to
perform vertical interpolation processing using pixels aligned in the vertical direction in a case where the interpolation direction information indicates the vertical direction, and
perform horizontal interpolation processing using pixels aligned in the horizontal direction in a case where the interpolation direction information indicates the horizontal direction.

6. The information processing device according to claim 1, further comprising:
a development unit configured to perform smoothing processing for noise reduction in the interpolation direction according to the interpolation direction information,
wherein the development unit is implemented via at least one processor.

7. The information processing device according to claim 1, further comprising:
an information obtaining unit configured to obtain the interpolation direction information according to the at least one test pattern projected by the projection device,
wherein the information obtaining unit is implemented via at least one processor.

8. The information processing device according to claim 7,
wherein the information obtaining unit obtains the interpolation direction information transmitted through communication with the projection device.

9. The information processing device according to claim 7, wherein
the information obtaining unit is further configured to
obtain information regarding the projection device, and
use the obtained information regarding the projection device to control at least one of the interpolation processor or an imaging unit that performs imaging.

10. An information processing method performed by an information processing device that performs interpolation processing on a captured image signal, the information processing method comprising:
performing the interpolation processing of pixel information in an interpolation direction based on interpolation direction information according to at least one test pattern projected by a projection device, with respect to an image signal obtained by capturing a projection image of the at least one test pattern,
wherein, when the at least one test pattern includes a plurality of test patterns, each test pattern of the plurality of test patterns is used as a pattern image capable of decoding identification information of each pixel in the projection image from images in which the plurality of test patterns are respectively captured.

11. A non-transitory computer-readable storage medium having embodied thereon a program, which when executed by a computer of an information processing device causes the information processing device to execute a method on a captured image signal, the method comprising:
performing interpolation processing of pixel information in an interpolation direction based on interpolation direction information according to at least one test pattern projected by a projection device, with respect to an image signal obtained by capturing a projection image of the at least one test pattern,
wherein, when the at least one test pattern includes a plurality of test patterns, each test pattern of the plurality of test patterns is used as a pattern image capable of decoding identification information of each pixel in the projection image from images in which the plurality of test patterns are respectively captured.

* * * * *